United States Patent
Choi et al.

(10) Patent No.: US 9,236,034 B2
(45) Date of Patent: Jan. 12, 2016

(54) DISPLAY METHOD, USER TERMINAL, AND SYSTEM FOR TRANSMITTING AND RECEIVING DATA USING THE SAME

(75) Inventors: Jae-won Choi, Seoul (KR); Dong-sung Kim, Gyeonggi-do (KR); Yoong-hee Lee, Gyeonggi-do (KR); Nam-geol Lee, Seoul (KR); Jae-won Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 916 days.

(21) Appl. No.: 12/880,577

(22) Filed: Sep. 13, 2010

(65) Prior Publication Data

US 2011/0063303 A1    Mar. 17, 2011

(30) Foreign Application Priority Data

Sep. 13, 2009    (KR) .................... 10-2009-0086204

(51) Int. Cl.
| | | |
|---|---|---|
| G06F 3/0485 | (2013.01) | |
| G06F 3/14 | (2006.01) | |
| G09G 5/34 | (2006.01) | |
| H04M 1/2745 | (2006.01) | |
| G06F 17/30 | (2006.01) | |

(52) U.S. Cl.
CPC .............. *G09G 5/34* (2013.01); *G06F 3/0485* (2013.01); *G06F 3/14* (2013.01); *G06F 17/30058* (2013.01); *H04M 1/274516* (2013.01); *G09G 2310/04* (2013.01); *G09G 2350/00* (2013.01); *H04M 1/274525* (2013.01)

(58) Field of Classification Search
CPC ...... G06F 3/0485; G06F 3/14; G09G 2310/04
USPC .......................................... 345/173, 530, 684
See application file for complete search history.

(56) References Cited

U.S. PATENT DOCUMENTS

| | | | | |
|---|---|---|---|---|
| 7,191,211 | B2 * | 3/2007 | Tuli ............................. | 709/203 |
| 8,209,606 | B2 * | 6/2012 | Ording ........................ | 715/700 |
| 2003/0196202 | A1 * | 10/2003 | Barrett et al. ................. | 725/50 |
| 2004/0049541 | A1 * | 3/2004 | Swahn ........................ | 709/203 |
| 2006/0265417 | A1 * | 11/2006 | Amato et al. ................ | 707/102 |
| 2007/0192443 | A1 | 8/2007 | Kim | |
| 2007/0208829 | A1 | 9/2007 | Kim et al. | |

FOREIGN PATENT DOCUMENTS

| | | |
|---|---|---|
| JP | 2008040529 | 2/2008 |
| KR | 100524588 | 10/2005 |
| KR | 100680296 | 2/2007 |
| KR | 100730058 | 6/2007 |

OTHER PUBLICATIONS

Korean Office Action dated Jul. 2, 2015 issued in counterpart application No. 10-2009-0086204.

* cited by examiner

*Primary Examiner* — Joni Richer
(74) *Attorney, Agent, or Firm* — The Farrell Law Firm, P.C.

(57) ABSTRACT

A display method, and a user terminal and a system for transmitting and receiving data using the same, are disclosed. The display method includes sequentially receiving first data from an external server, and displaying the received first data in the order of receiving the first data; discontinuing to receive un-received data among the first data, receiving the second data from the external server, and displaying the received second data on a screen; and continuing to receive the discontinued data from the external server.

23 Claims, 13 Drawing Sheets

DISPLAY METHOD, USER TERMINAL, AND SYSTEM FOR TRANSMITTING AND RECEIVING DATA USING THE SAME

PRIORITY

This application claims priority under 35 U.S.C. §119(a) to an application filed in the Korean Intellectual Property Office on Sep. 13, 2009 and assigned Serial No. 10-2009-0086204, the contents of which are hereby incorporated by reference.

BACKGROUND

1. Field of the Invention

The present invention relates generally to a display method, a user terminal and a system for transmitting and receiving data using the same, and more particularly, to a display method to receive and display data satisfying a user's intention, and a user terminal and a system for transmitting and receiving data using the same.

2. Description of the Related Art

Recently, with the growing popularity of multimedia devices, the number of contents used in the multimedia devices has dramatically increased. The increase of contents enables a user to select and use various contents.

Among with such positive aspects, such as providing abundant contents, negative aspects also appear. One of the negative aspects is an excessive amount of contents. A great amount of contents may enable a user to have a huge selection of contents, but may confuse a user as well. Since the contents are typically displayed on a limited area of a display, the number of pages required to display the contents increases and the font size of contents is reduced.

Another negative aspect is over-charging due to unnecessary contents. If a user receives contents in real-time, unnecessary contents may also be transmitted to the user, thereby wasting money by receiving unnecessary contents.

Accordingly, there is a need for methods to transmit only contents or data to a user that satisfies the user's intention.

SUMMARY

Accordingly, the present invention has been made to solve the above-mentioned problems occurring in the prior art, and the present invention provides a display method which displays data needed by a user in a limited area of a display, enables a user to easily manipulate a user terminal, and prevents over-charging caused by receiving unnecessary data. A user terminal, and a data transmission and reception system using the same are also provided.

In accordance with an aspect of the present invention, there is provided a display method, which includes sequentially receiving first data from an external server, and displaying the received first data in the order of the first data being received; if a command for displaying second data is input before all of the first data is received, discontinuing to receive un-received data among the first data, receiving the second data from the external server, and displaying the received second data on a screen; and if the displaying of the second data is completed, continuing to receive the discontinued first data from the external server.

The display method further includes storing the data received from the external server in an internal memory, and displaying received data that is not stored in the internal memory from the external server, among the first and second data.

The display method further includes if a command for displaying third data is input before all of the second data is received, discontinuing to receive un-received data among the second data, receiving the third data from the external server, and displaying the received third data, wherein the discontinued data among the first and second data from the external server is received if the displaying of the third data is completed.

In accordance with another aspect of the present invention, there is provided a user terminal which receives and displays data stored in a server, the user terminal including a transmitting and receiving unit which requests the server to transmit data, and receives the requested data; and a controlling unit, which sequentially receives first data from the server and displays the data in the order of the data being received; if a command for displaying second data is input before all of the first data is received, the controlling unit discontinues to receive un-received data among the first data, receives the second data from the server, and displays the received second data on a screen; and if the displaying of the second data is completed, the controlling unit continues to receive the discontinued first data from the server.

The user terminal further includes a memory that stores the data received from the server, wherein the controlling unit receives data that is not stored in the memory from the server, among the first and second data, and displays the received data.

If a command for displaying third data is input before all of the second data are received, the controlling unit discontinues to receive un-received data among the second data, receives the third data from the server; and if the displaying of the third data is completed, the controlling unit may display the received third data, and the controlling unit continues to receive the discontinued data among the first and second data from the server.

The controlling unit continues to receive the discontinued data among the first data and then continues to receive the discontinued data among the second data.

The controlling unit may substitute temporary data for the discontinued data among the first data, and display the temporary data.

The first data includes data that is displayed on the screen when a command for displaying a list of data is input, and the second data may include data that is displayed on the screen when a command for scrolling the list of data is input.

In accordance with an aspect of the present invention, there is provided a data transmission system which transmits data stored in a server to a user terminal, the data transmission system, including a server which stores a plurality of data, transmits requested data to the user terminal; and a user terminal which sequentially receives first data from the server and displays the data in the order of the data being received; if a command for displaying second data is input before all of the first data is received, the user terminal discontinues to receive un-received data among the first data, receives the second data from the server, and displays the received second data on the screen; and if the displaying of the second data is completed, the user terminal continues to receive the discontinued first data from the server.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
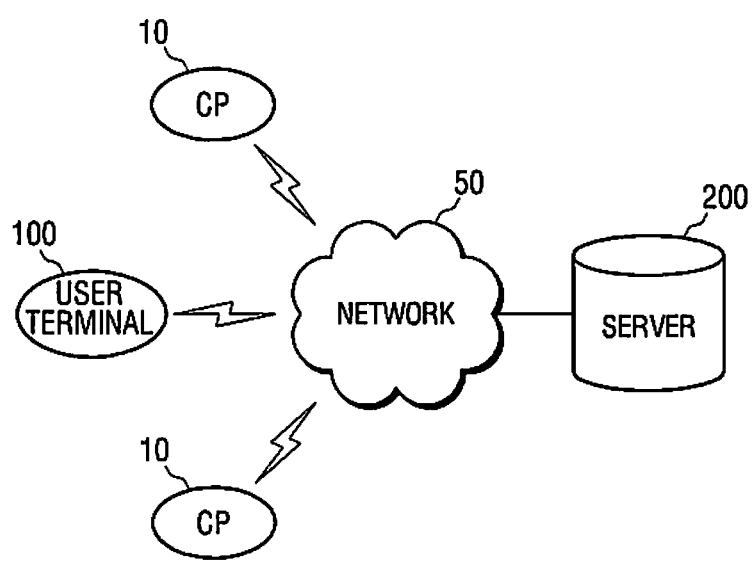
FIG. 1 illustrates a data transmission system according to an embodiment of the present invention.

Hereinafter, various embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a data transmission system according to an embodiment of the present invention. The data transmission system provides a user with data that is produced by a content provider (CP) and stored in a server in real-time.

Referring to FIG. 1, the data transmission system comprises a content provider (CP) 10, network 50, a user terminal 100, and a server 200. The CP 10, which produces contents or generates data, transmits the contents or data to the server 200 over the network 50, and causes the server 200 to store the contents or data.

The user terminal 100 accesses the server 200 over the network 50, and receives the contents or data stored in the server 200 so that a user uses the received contents or data. The user terminal 100 transmits a condition for selecting data such as a keyword input by a user to the server 200, and then the server 200 selects the data associated with the condition and transmits the selected data to the user terminal 100 over the network 50. In this situation, the server 200 does not transmit all of the data associated with the condition to the user terminal 100. The server 200 transmits as many as data that can be displayed on a screen of the user terminal 100 at once to the user terminal 100, and then if a user inputs a command for moving a page on the screen of the user terminal 100, the server 200 transmits data to be displayed on a corresponding page to the user terminal 100. That is, the user terminal 100 transmits a message for requesting a data transmission to the server 200 based on real-time operation, and the server 200 transmits the data according to the request of the user terminal 100.

The server 200 stores contents or data, which are produced or generated by the CP 10, and transmits data according to the request of the user terminal 100 to the user terminal 100.

Figure 2:
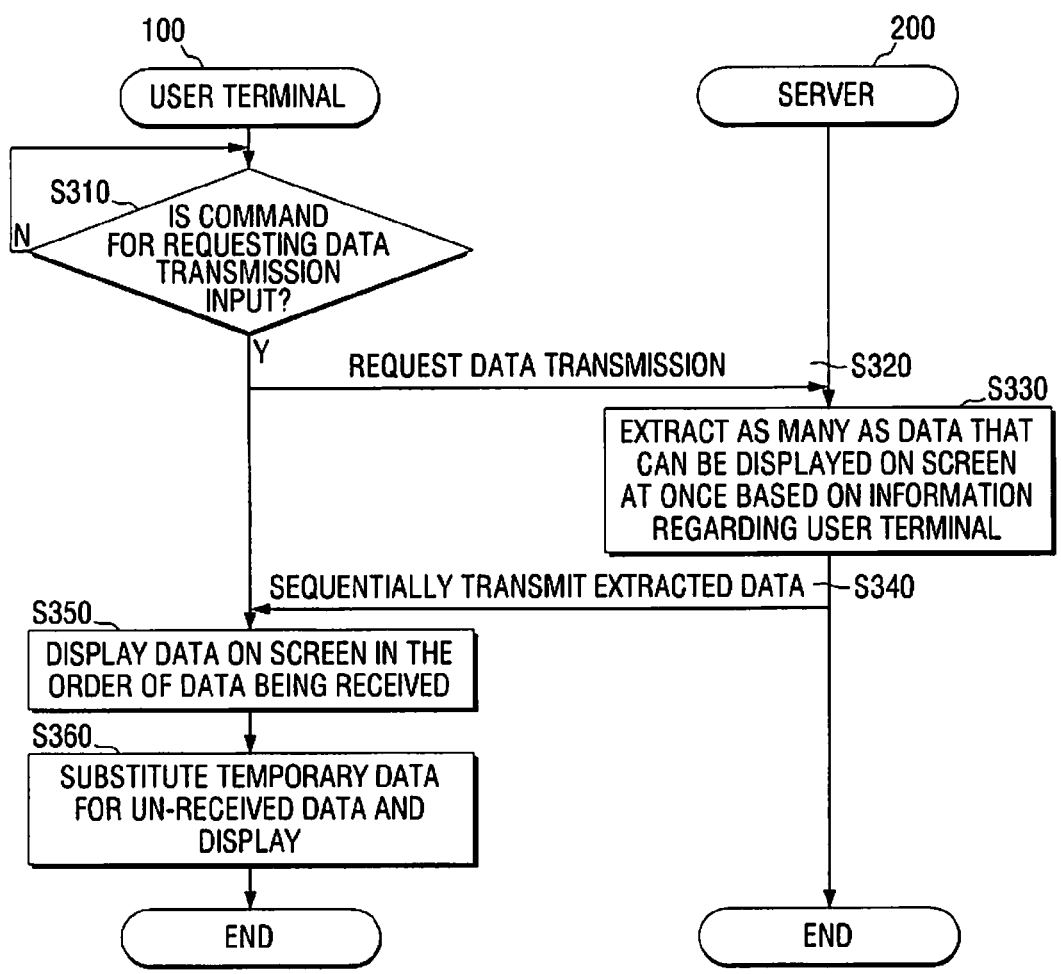
FIG. 2 is a flowchart of a method for receiving data that is not stored in a user terminal from a server, and displaying the data.

FIG. 2 is a flowchart of a method for receiving data, which is not stored in a user terminal from a server, and displaying the data.

The user terminal 100 determines whether a user inputs a command for requesting a data transmission in step S310. The command for requesting a data transmission may be a manipulation of inputting a search condition such as touching a screen and pressing a button or key using the user terminal 100. If a user inputs a command for requesting a data transmission in step S310, the user terminal 100 requests the server 200 to transmit data in step S320. Of course, not all of the commands for requesting a data transmission are transmitted to the server 200. When the requested data is not stored in the user terminal 100 or the command for requesting the data stored in the server 200 is input by a user, the corresponding data is transmitted.

The server 200 analyzes the requested data, and extracts as many data that can be displayed on the screen of the user terminal 100 at once from among the requested data based on the information regarding the user terminal 100 in step S330. The server 200 sequentially transmits the extracted data to the user terminal 100 in step S340.

For example, if it is possible to display data of five contents on the screen of the user terminal 100 at once, the server 200 does not extract and transmit all of the data satisfying the search condition input to the user terminal 100, but extracts the data of only five contents and transmits the extracted data to the user terminal 100.

The above operation will be explained with reference to FIG. 3, which is a view illustrating a limited number of data, as many data that can be displayed on a screen is received.

Figure 3:
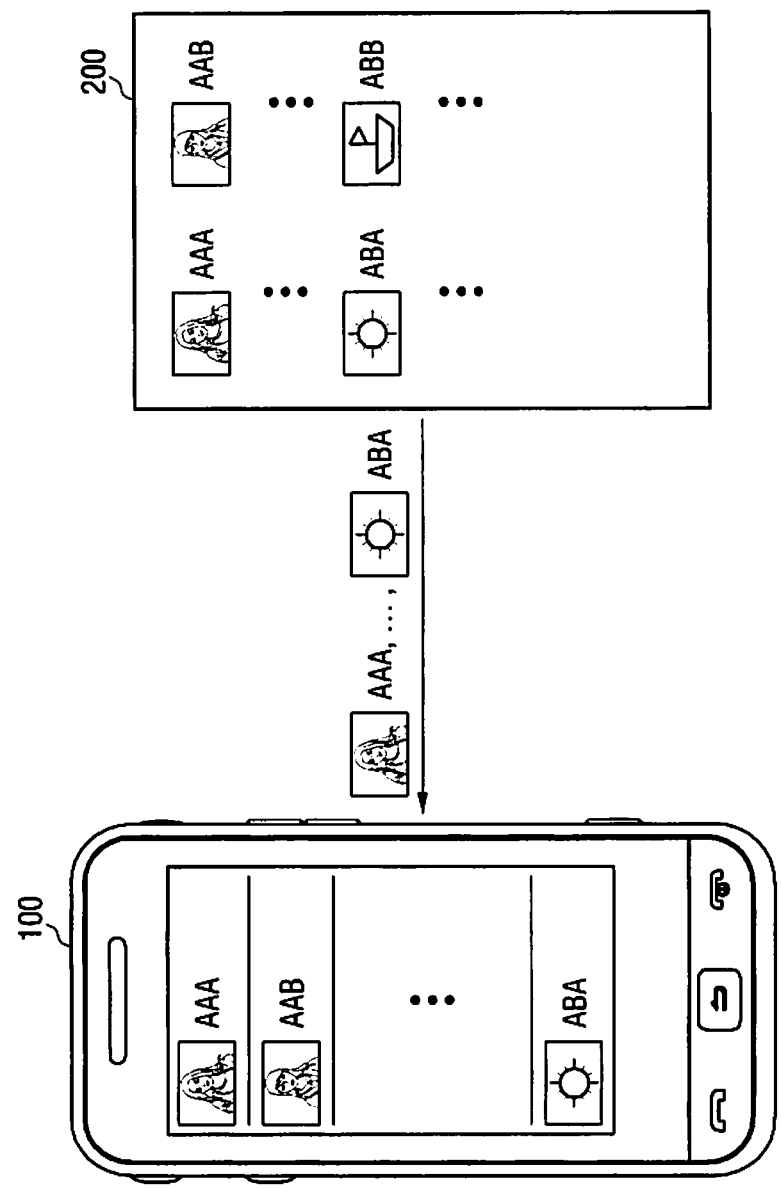
FIG. 3 is a view illustrating a limited number of data, as many data that can be displayed on a screen being received.

Referring to FIG. 3, the server 200 does not transmit all of the data, which are requested by the user terminal 100 to the user terminal 100. Instead, the server 200 extracts as many data that can be displayed on the screen of the user terminal 100 at once and sequentially transmits the extracted data to the user terminal 100. Data is received serially over a single line in FIG. 3, but this is merely shown for convenience of description. A plurality of data may be received over one or more lines in parallel, in serial, or in parallel/serial combination.

Referring again to FIG. 2, the server 200 extracts and transmits only as many data that can be displayed on the screen of the user terminal 100 at once to the user terminal 100, to relieve user inconvenience in selecting data due to unnecessary transmission of data, and to prevent over-charging for the unnecessary data.

The data, which is not transmitted to the user terminal 100 despite the request of the user terminal 100, may be transmitted later when the user terminal 100 requests the data again. Therefore, the above operation resolves the problems caused by transmitting data in advance, that is, the difficulty in displaying data on a limited area of a screen, the confusion by displaying data indiscriminately, and over-charging.

The user terminal 100 sequentially receives data from the server 200, and displays the received data on the screen of the user terminal 100 in step S350. For example, if data of five contents can be displayed on the screen of the user terminal 100 at once, and thus the data of five contents are sequentially transmitted to the server 200, the user terminal 100 may display the sequentially received data of five contents on the screen in the order of the data being received.

As described above, the sequentially transmitted data may confuse a user since the contents that have not been received yet are displayed differently from those already received. For example, suppose data requested by a user is a thumbnail image. If the data which has been received already is displayed as a thumbnail image, and the data which has not been received yet has no configuration, a user may be confused as to whether the data has not been received yet or the network between the user terminal 100 and the server is disconnected.

In addition, suppose the data received from the server 200 includes both image data and text data. If the text data is already received and displayed, while the corresponding image data is not received and displayed, a user can not recognize whether an image corresponding to the already received text data exists.

To prevent such problems, the user terminal 100 substitutes temporary data for the un-received data, and displays the temporary data in step S360, and if the un-received data is received, the user terminal 100 displays the received data instead of the temporary data.

Figure 4:
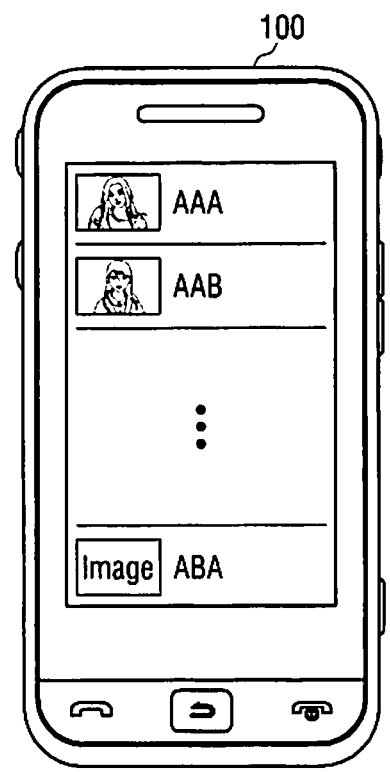
FIG. 4 is a view illustrating a method for displaying un-received data according to an embodiment of the present invention.

The above operation will be explained with reference to FIG. 4, which is a view illustrating a method for displaying un-received data according to an embodiment of the present invention. Referring to FIG. 4, data are sequentially received, and the data are displayed in the order of the data being received. Data of contents 'AAA' and 'AAB' are transmitted from the server 200 to the user terminal 100, but an image data of content 'ABA' is not received in FIG. 4.

If an image data is not received, the user terminal 100 may display temporary image data instead of an un-received image data on the screen. In FIG. 4, only the image data of content 'ABA' is not received, but there may be other data, which have not been received, and the other data may be displayed as temporary image data with the text 'IMAGE' being inserted in the same manner as 'ABA.' The data having the text 'IMAGE' is pre-stored in the user terminal 100.

The operation in which another manipulation is input by a user while data is not received will be explained with reference to FIG. 5, which is a flowchart of the operation in which another manipulation is input while data is received.

The user terminal 100 determines whether a user inputs a scroll command in step S410. The scroll command is used to view data that are not currently visible on the screen. Scrolling may be done with using arrow buttons of a keypad or touching a touchscreen upward, downward, leftward, or rightward. The method for inputting the scroll command will be explained later.

As described above, the case in which a user inputs a scroll command to view data that are not currently visible on the screen represents a new transmission command for data that are not transmitted from the server 200 to the user terminal 100, or data that are not expected to be transmitted.

That is, since the server 200 extracts as many data that can be displayed on the screen of the user terminal 100 at once, and then transmits the data to the user terminal 100, the server extracts new data instead of the previously transmitted data or the data expected to be transmitted, and transmits the new data to the user terminal 100 to respond to the command to view data which are not displayed on the screen of the user terminal 100.

If it is determined that the scroll command is input in step S410, the user terminal 100 determines whether data is being received from the server 200 according to a previous command in step S420, and if the data is being received, the user terminal 100 requests the server 200 to discontinue data transmission in step S430.

The reason for discontinuing data transmission according to the previous command input by a user is that data transmission according to the new command satisfies a user's intention better than the data transmission according to the previous command. That is, if a user desires to continuously view the data according to the previous command, the user may not input the scroll command. Accordingly, it is assumed that the user inputs the scroll command to view new data rather than the data according to the previous command.

As described above, if the data according to the previous command is being received, the user terminal 100 requests the server 200 to discontinue data transmission, and calculates the degree of scrolling in step S440. In this situation, if the data according to the previous command is not being received, the user terminal 100 immediately calculates the degree of scrolling in step S440.

If the degree of scrolling is calculated, the user terminal 100 determines whether data corresponding to the scrolled portion is pre-stored in an internal memory in step S450. Data corresponding to the scrolled portion is pre-stored in an internal memory when a user has already manipulated a scroll, and thus data corresponding to the scrolled portion is received from the server 200 according to the manipulation.

Accordingly, if it is determined that the data is pre-stored in the internal memory in step S460, the user terminal 100 reads out data from the internal memory without requesting the server 200 to transmit the data in step S470, and displays the read data on the screen in step S480. If a part of data displayable on the screen of the user terminal 100 is pre-stored in the internal memory, the user terminal 100 may read out and display the part of data, and request the server 200 to transmit the other part of data.

However, if it is determined that the data is not pre-stored in the internal memory in step S460, the user terminal 100 requests the server 200 to transmit data which is not stored in the internal memory in step S490. The server 200 then extracts data according to the request of the user terminal 100 in step S500, and sequentially transmits the extracted data to the user terminal 100 in step S510. The user terminal 100 displays the data received from the server 200 on the screen in the order of the data being received in step S520, substitutes temporary data for an un-received data, and displays the temporary data instead of the un-received data in step S530.

Another scroll command may be input by a user while data is received from the server 200. Accordingly, the user terminal 100 determines whether another scroll command is input in step S540, and if so, steps S420 to S530 are repeated.

Figure 6:
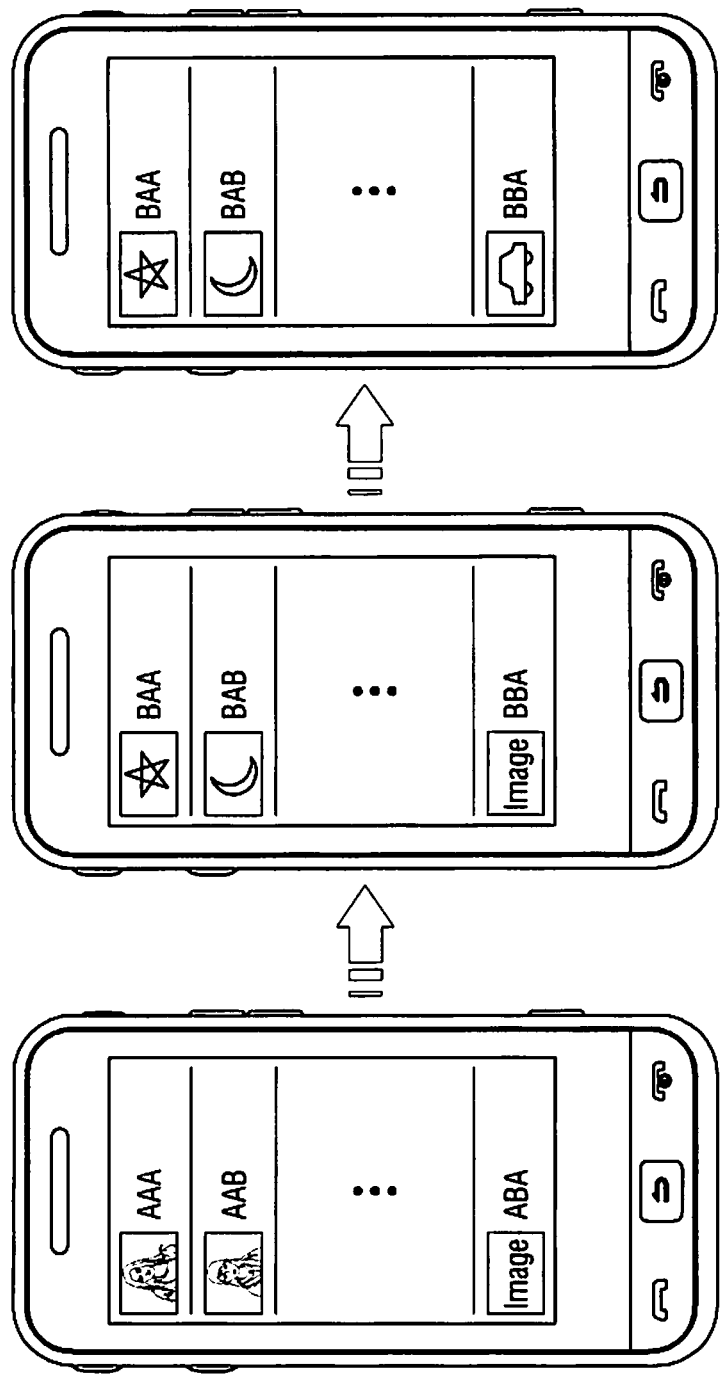
FIG. 6 is a view illustrating a screen when another command is input while data is received.

FIG. 6 is a view illustrating a screen when another command is input while data is received. The left side of FIG. 6 illustrates a screen in which previous data are received. Data of contents 'AAA' and 'AAB' are received, whereas data of content 'ABA' is not received. If a command for requesting new data is input while the previously stored data are received, the user terminal 100 requests the server 200 to discontinue transmitting the data of content 'ABA' and to transmit new data.

The center of FIG. 6 illustrates a screen in which the data having text 'IMAGE' is displayed on an area on which data of content 'BBA' should be displayed, and this means that new data are being received. The new data are sequentially received from the server 200 and displayed on the screen in the order of the data being received. The right side of FIG. 6 illustrates a screen in which all of the new data are received.

The discontinuation of transmitting the previously stored data may better satisfy the user's intention to view data according to the new command rather than to view data according to the previous command.

Figure 7:
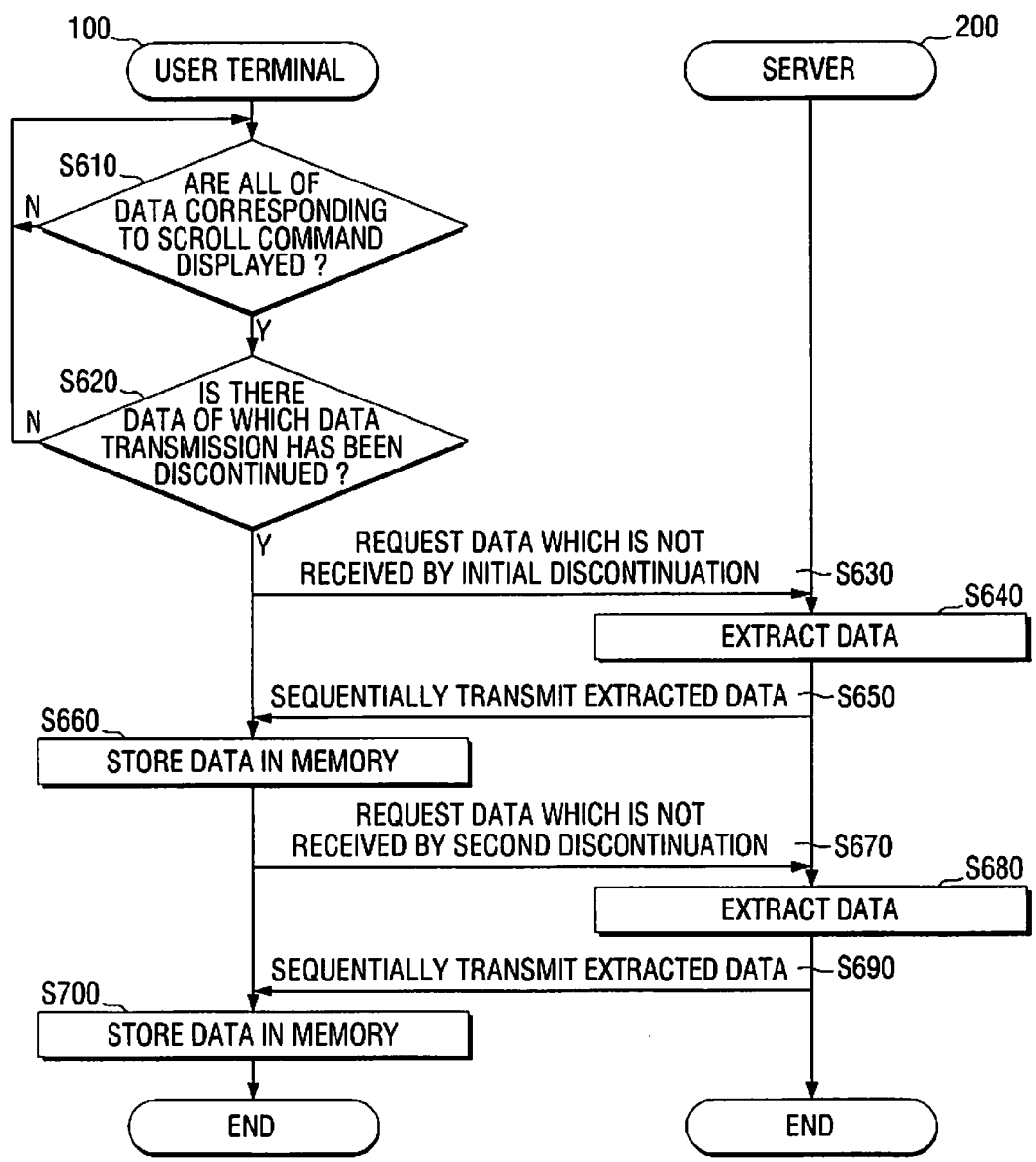
FIG. 7 is a flowchart of the operation of re-receiving previous data.

The operation after receiving all of the data according to another command of a user will be explained with reference to FIG. 7, which is a flowchart of the operation of re-receiving previous data.

After all of the new data are received through the process explained with reference to FIG. 5, the user terminal 100 performs the process of receiving the un-received data again to be prepared for the request by a user to view the un-received data. The process of re-receiving data may be more useful in network environment where over-charging for the unnecessary data does not occur.

The user terminal 100 determines whether all of the data responding to the scroll command are received and displayed in step S610. If the data responding to the scroll command are received and displayed in step S610, the user terminal 100 determines whether there is the data of which data transmission has been discontinued in step S620.

Figure 5:
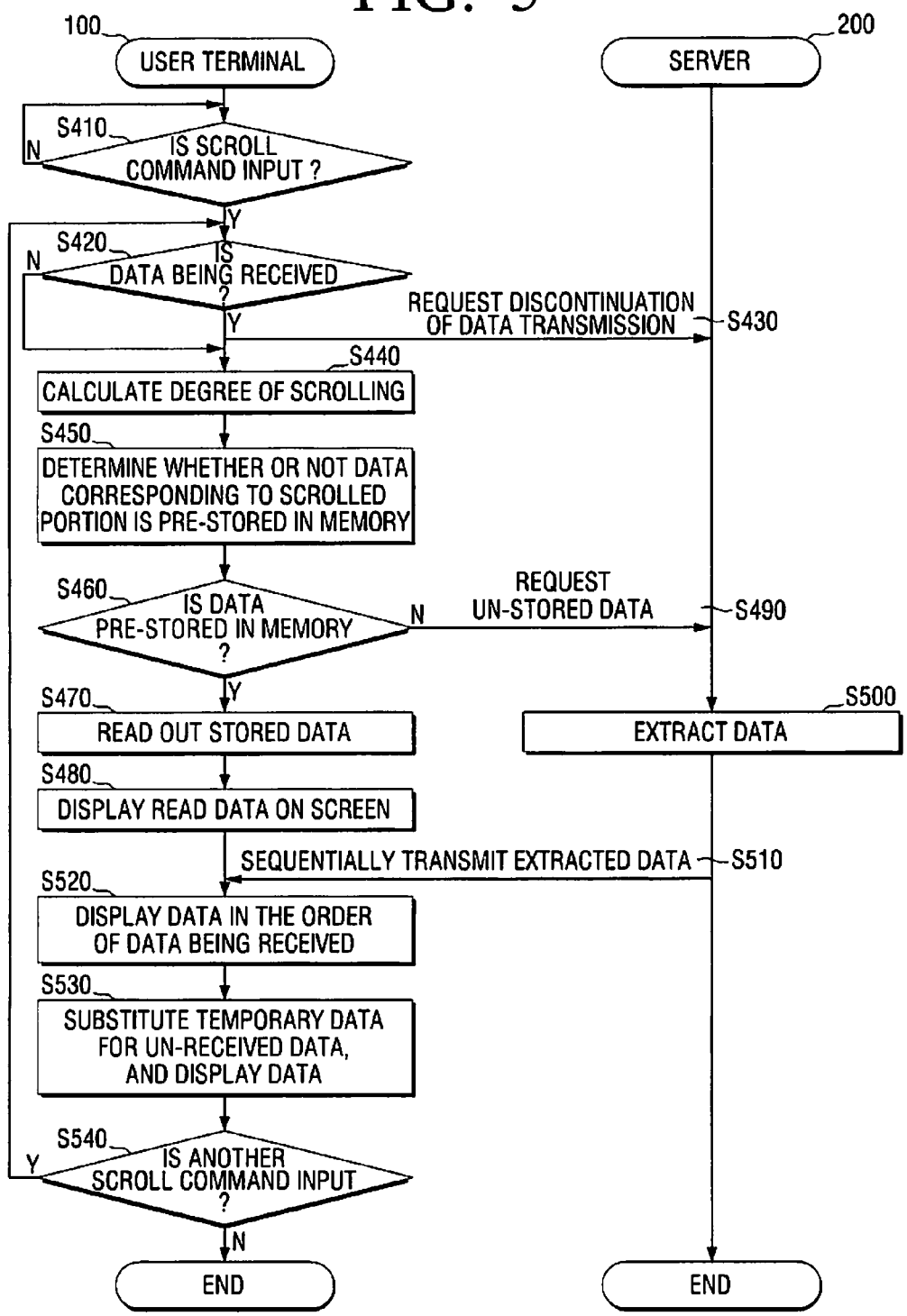
FIG. 5 is a flowchart of the operation in which a manipulation is input while data is received.

Another data transmission command may be input while new data is being received in FIG. 5. That is, the discontinuation of data transmission may occur many times.

Accordingly, the user terminal 100 requests the server 200 to transmit the data that is not received by the initial discontinuation in step S630. The server 200 extracts the requested data in step S640, and sequentially transmits the extracted data to the user terminal 100 in step S650. The user terminal 100 stores the received data in the internal memory without displaying the received data in step S660. That is, since the user terminal 100 does not receive the un-received data based on the command for transmitting un-received data, the user terminal 100 receives the un-received data and stores the received data in the internal memory so that the user terminal 100 reads out the data from the internal memory and immediately provides the data when a user inputs a command to request the data.

The user terminal 100 requests the server 200 to transmit data, which is not received by the second discontinuation in step S670. Accordingly, the server 200 extracts the requested data in step S680, and sequentially transmits the extracted data to the user terminal 100 in step S690. The user terminal 100 then stores the received data in the internal memory in step S700.

By doing so, the user terminal 100 may prepare for the request for transmitting an un-received data, and if the user terminal 100 is requested to transmit the un-received data, the user terminal 100 reads out the un-received data from the internal memory instead of receiving the un-received data from the server 200. Accordingly, the user terminal 100 may more quickly transmit the data to the user.

Figure 8:
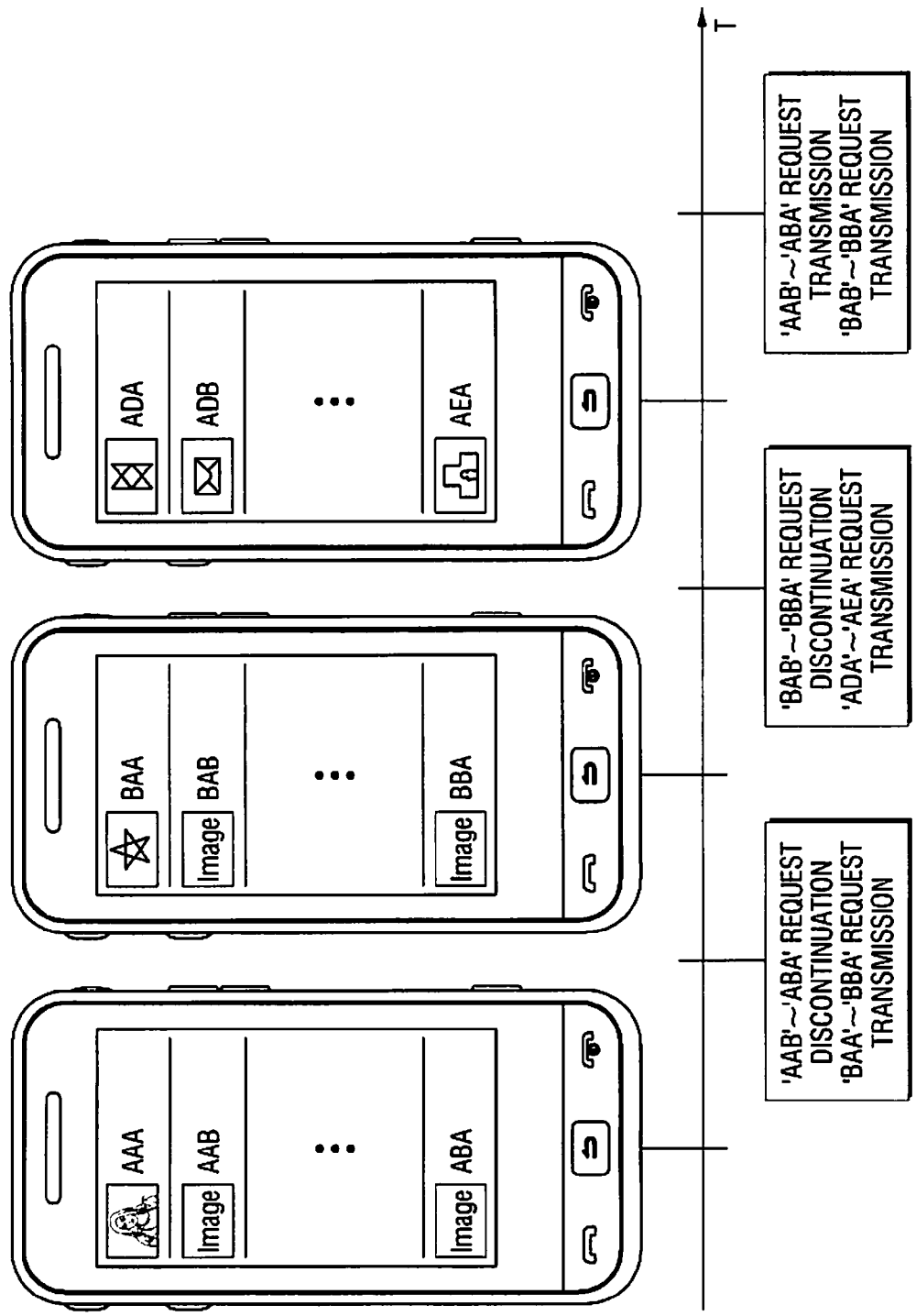
FIG. 8 is a view illustrating data displayed on a user terminal and commands generated by a user terminal during the process of receiving un-received data.

FIG. 8 illustrates data displayed on a user terminal and commands generated by a user terminal during the process of receiving un-received data.

If there is a data transmission command input by a user as shown in FIG. 8, the user terminal 100 sequentially receives data of contents 'AAA' to 'ABA' from the server 200 according to the data transmission command, displays the received data on the screen, and substitutes temporary data for un-received data. Referring to the left side of FIG. 8, data of contents 'AAB' and 'ABA' are not received.

If a user manipulates a scroll, the user terminal 100 requests the server 200 to discontinue transmitting data of contents 'AAB' to 'ABA' and to transmit data of contents 'BAA' to 'BBA' according to the scroll manipulation. The user terminal 100 sequentially displays the received data of contents 'BAA' to 'BBA' on the screen. The center of FIG. 8 illustrates a screen in which data of contents 'BAA' to 'BBA' are received, and data of contents 'BAB' to 'BBA' are not received.

If a user manipulates a scroll, the user terminal 100 requests the server 200 to discontinue transmitting the un-received data of contents 'BAB' to 'BBA' and to transmit data of contents 'ADA' to 'AEA' according to the scroll manipulation. The user terminal 100 displays the data of contents 'ADA' to 'AEA' on the screen according to the transmission request in the order of the data being received.

After the data of contents 'ADA' to 'AEA' are received and displayed, the user terminal 100 requests the server 200 to transmit the un-received data of contents 'AAB' to 'ABA', and then requests the server 200 to transmit the un-received data of contents 'BAB' to 'BBA.'

Figure 9:
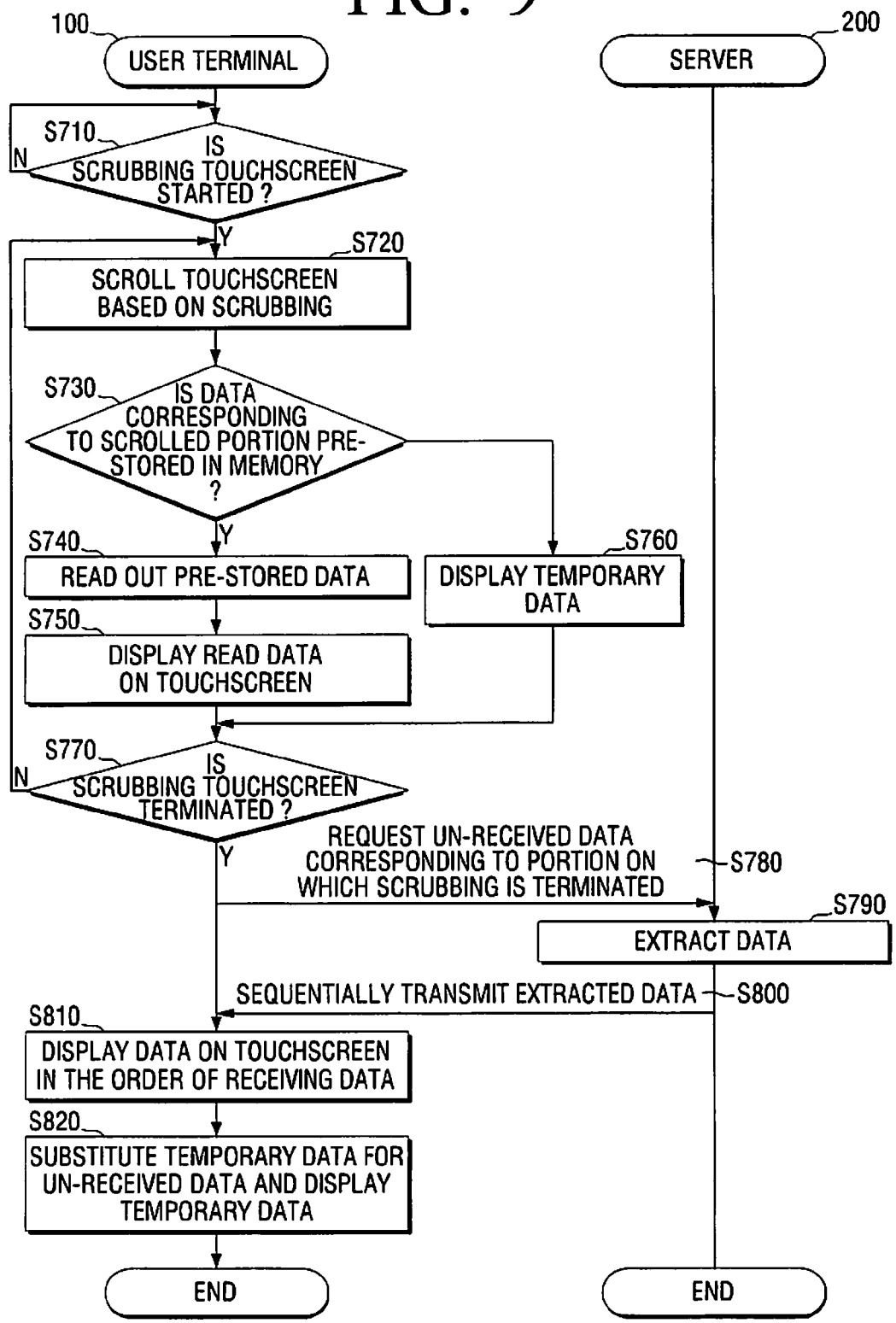
FIG. 9 is a flowchart of a method for receiving data according to a manipulation of scrubbing a touchscreen.

A scroll manipulation input by a user will be explained in detail with reference to FIG. 9, which is a flowchart of a method for receiving data according to a manipulation of scrubbing a touchscreen. The scrubbing manipulation, which is performed on the touchscreen, may be the same as a touch and move manipulation. Accordingly, the user terminal 100 may scroll the touchscreen to display data according to the touch and move manipulation.

If a user starts scrubbing the touchscreen in step S710, the user terminal 100 scrolls the touchscreen based on the scrubbing in step S720. The scrubbing represents an operation of displaying new data as if the touchscreen moves up, down, left, or right. Accordingly, if the touchscreen is scrolled, the user terminal 100 may need to receive new data from the server 200.

The user terminal 100 determines whether data corresponding to the scrolled portion is pre-stored in the internal memory in step S730, and if so, the user terminal 100 reads out the pre-stored data in step S740, and displays the read data on the touchscreen in step S750.

However, if the data corresponding to the scrolled portion is not pre-stored in the internal memory in step S730, the user terminal 100 displays temporary data stored in the internal memory in step S760. In this situation, since the user does not terminate the manipulation of scrubbing the touchscreen, even if the data corresponding to the scrolled portion is not pre-stored in the internal memory, the user terminal 100 does not request the server 200 to transmit such data. This is because the data being displayed while a user continues to scrub the touchscreen may not be the data desired by the user.

Accordingly, if the scrubbing is not terminated in step S770, the user terminal 100 repeats steps S720 to S760 based on the scrubbing. If a user stops scrubbing the touchscreen in step S770, that could mean that the user desires to receive the data corresponding to the portion on which the scrubbing is stopped. Accordingly, the user terminal 100 requests the server 200 to transmit the un-received data corresponding to the portion on which the scrubbing is terminated in step S780, and the server 200 extracts the requested data in step S790 and sequentially transmits the extracted data to the user terminal 100 in step S800.

The user terminal 100 sequentially displays the data received from the server 200 on the touchscreen in the order of the data being received in step S810, and substitutes temporary data for the un-received data and displays the temporary data instead of the un-received data in step S820.

By doing so, only data satisfying a user's intention may be transmitted to the user.

Figure 10:
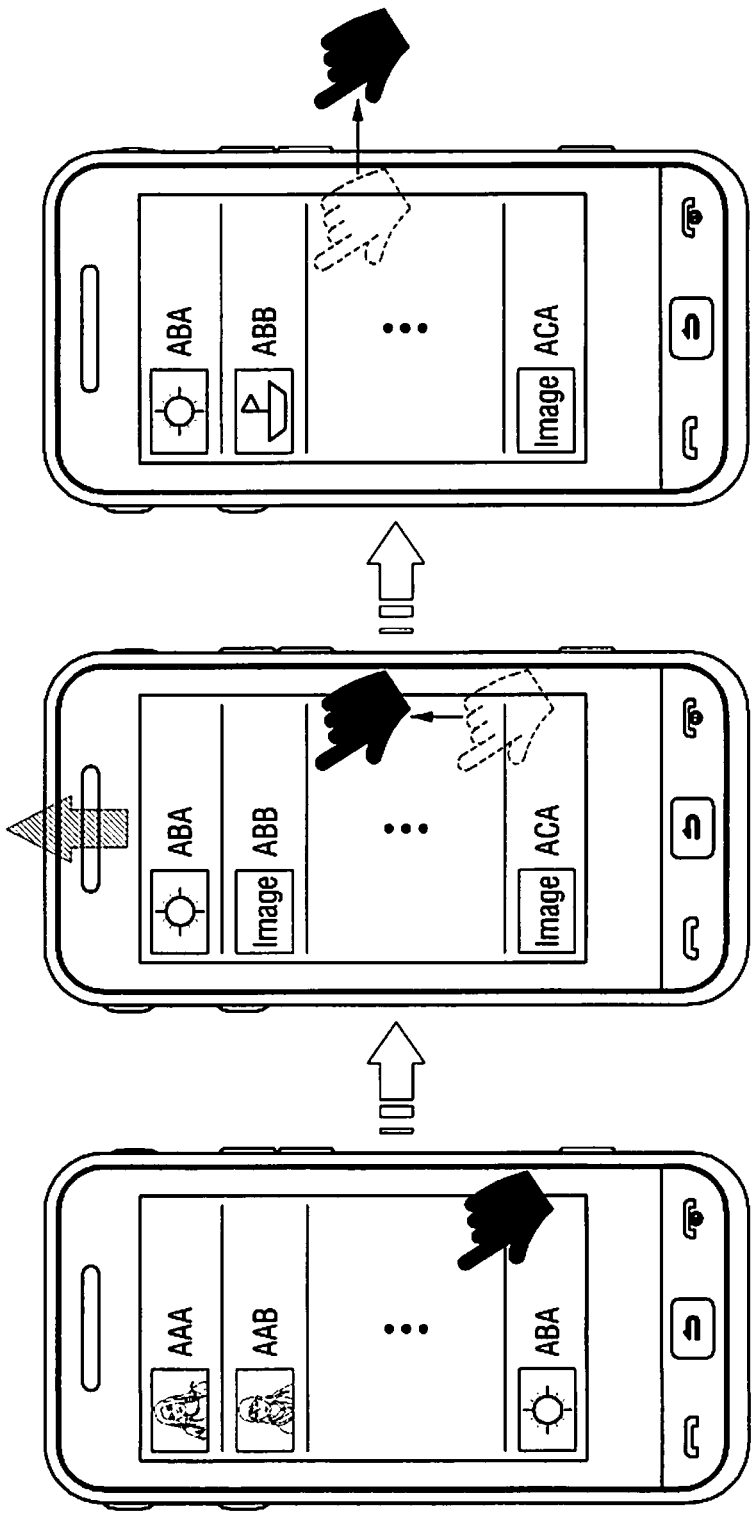
FIG. 10 illustrates a screen after a user scrubs the touchscreen.
Figure 11:
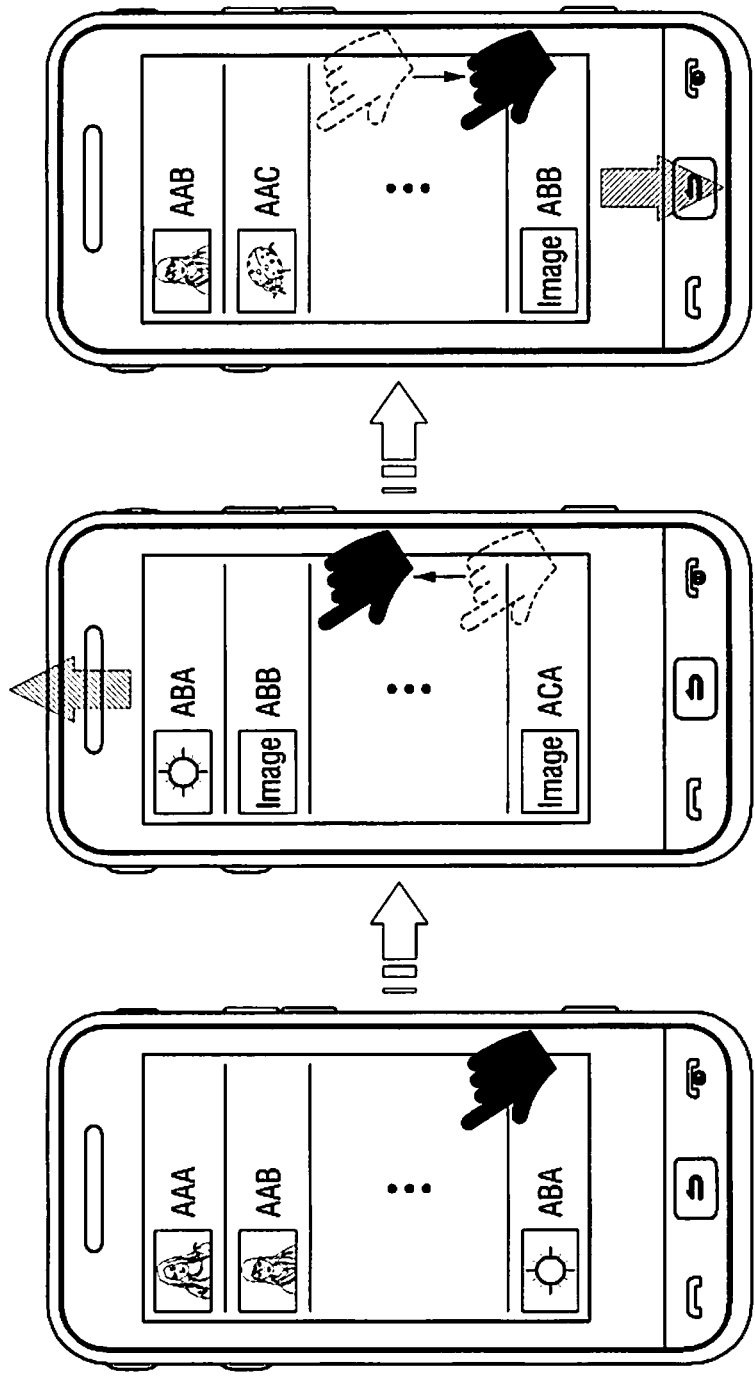
FIG. 11 illustrates a screen in which a user scrubs the touchscreen again after the user first scrubs the touchscreen.

FIGS. 10 and 11 illustrates a screen in which data are displayed according to the scrubbing. FIG. 10 illustrates a screen after a user scrubs the touchscreen.

If a user starts scrubbing the touchscreen as shown in the left side of FIG. 10, and scrubs the touchscreen upward as shown in the center of FIG. 10, data displayed on the touchscreen move upward, and thus other data below the data may be visible. In this situation, since the scrubbing is not released, the server 200 is not requested to transmit data of contents 'ABB' to 'ACA.'

If the scrubbing is released as shown in the right side of FIG. 10, the user terminal 100 may determine that a user requests data corresponding to the portion on which scrubbing is released, and requests the server 200 to transmit the data. Accordingly, the data of contents 'ABB' to 'ACA' are sequentially transmitted and displayed on the touchscreen as shown in the right side of FIG. 10.

FIG. 11 illustrates a screen in which a user scrubs the touchscreen again after the user has already scrubbed the touchscreen. The left side and center of FIG. 11 are identical to those of FIG. 10. If a user does not stop scrubbing the touchscreen as shown in the right side of FIG. 10, and continues to scrub the touchscreen downward as shown in the right side of FIG. 11, data moves downward, and thus data above the currently displayed data may be displayed.

As the data of contents 'AAB' and 'AAC' are already received and stored in the internal memory, thumbnail images instead of a temporary image for contents 'AAB' and 'AAC' are displayed on the touchscreen as shown in the right side of FIG. 11. However, since the data of content 'ABB' is not received, and a user stops scrubbing the touchscreen, the server 200 is not requested to transmit the data of content 'ABB.'

Figure 12:
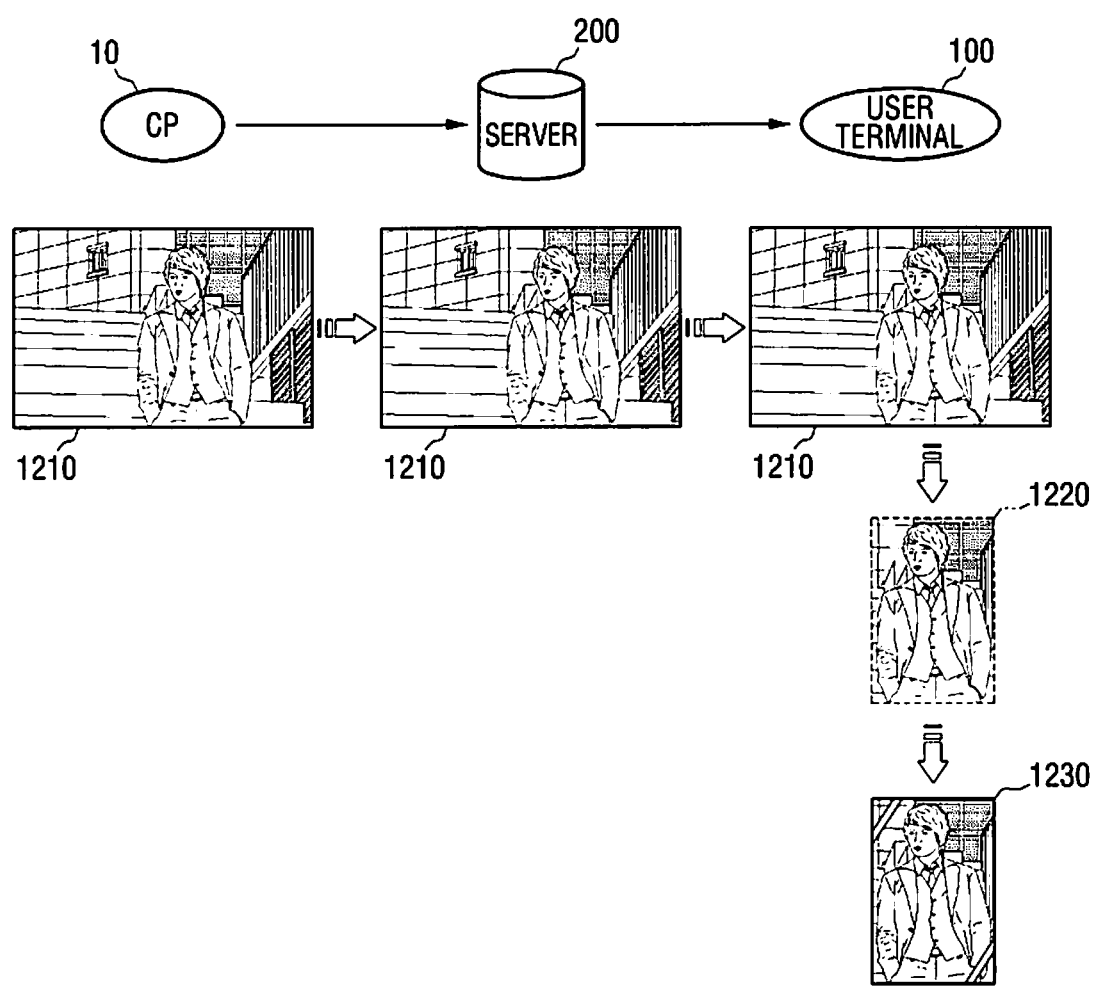
FIG. 12 is a view illustrating a method for processing data received from a content provider (CP)

FIG. 12 is a view illustrating a method for processing data received from the CP 10. According to the above description, the contents or data produced or generated by the CP 10 are transmitted to and stored in the server 200, and the user terminal 100 receives the data.

However, the CP 10 produces various kinds of contents, and various kinds of contents may confuse a user. Accordingly, contents or data may need to be standardized and then provided to a user.

Accordingly, data 1210, which is received from the CP 10 and transmitted to the server 200 as it is, is transmitted to the user terminal 100 according to the user's request, and is processed to be standardized. That is, the user terminal 100 separates the data 1210 received from the server 200 into a predetermined size, processes the separated data 1220 according to a predetermined standard such as adding an outline and effects to generate a processed data 1230. The above operation may alleviate a user using the data from being confused.

In addition, as illustrated in FIG. 12, the user terminal 100 can cut the received data 1210 to have a specific size, and thus a large image may be scrolled upward, downward, leftward, or rightward. For example, the user terminal 100 may cut a newspaper image to fit for a screen size and display the cut image on the screen one by one. If a command for scrolling upward, downward, leftward, or rightward is input, the user terminal 100 moves from one cut image to another. As such, the user terminal 100 may cut and display an image, which is larger than a screen size, and scroll the image by each cut image.

Figure 13:
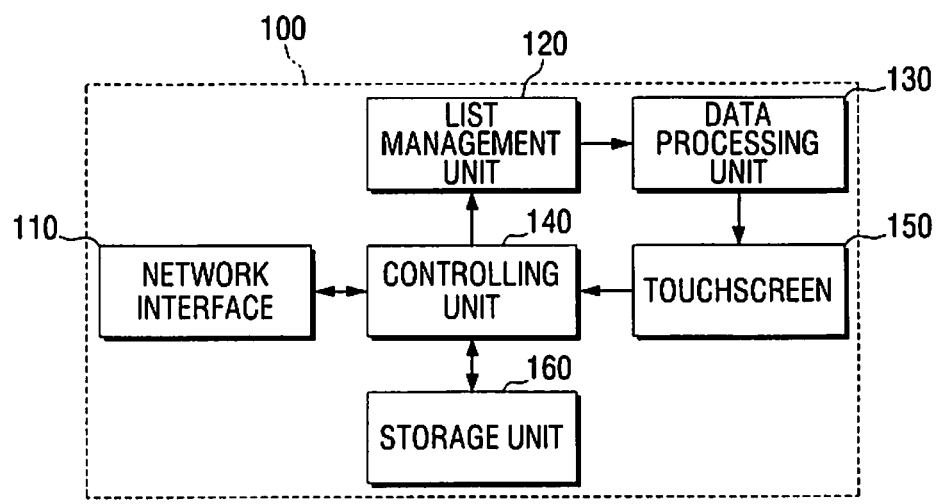
FIG. 13 is a block diagram illustrating a user terminal according to an embodiment of the present invention.

FIG. 13 is a block diagram illustrating the user terminal 100 which has been described above. In FIG. 13, elements of the user terminal are described in detail.

The user terminal 100 comprises a network interface 110, a list management unit 120, a data processing unit 130, a controlling unit 140, a touchscreen 150, and a storage unit 160. The network interface 110 provides a path for communication between the user terminal 100 and the network 50. The user terminal 100 may transmit the requests for transmitting data, discontinuing data transmission, and re-transmitting data to the server 200 via the network interface 110, and receive data from the server 200.

The list management unit 120 manages a list of data received from the server 200. The list management unit 120 arranges the order of operations based on the scroll manipulation of a user. For example, if there is un-received data at the time a user manipulates a scroll, the list management unit 120 causes the un-received data to be operated on late, and data needed to be displayed on the screen corresponding to the scrolling to be operated on early. If the list management unit 120 arranges the order of operations, information regarding the order of operations may be transmitted to the data processing unit 130.

The data processing unit 130 processes data received from the server 200 in the order of operations input by the list management unit 120. The operation of processing data may be image processing such as adding an outline and effects to a thumbnail image as described above. The data processing unit 130 processes data in the order of operations input by the list management unit 120, and transmits the processed data to the touchscreen 150 to display the processed data.

The touchscreen 150 displays the processed data, receives manipulation such as scrubbing from a user, and transmits the manipulation to the controlling unit 140.

The storage unit 160 stores programs to execute overall operations of the user terminal 100, and various information and data received from the server 200. The storage unit 160 may include a hard disc drive, which stores the programs to execute overall operations of the user terminal 100 and a memory, which stores the data received from the server 200.

The controlling unit 140 controls overall operations of the user terminal 100. The controlling unit 140 requests the server 200 to transmit data via the network interface 100 according to the manipulation, or to discontinue data transmission. The controlling unit 140 controls the list management unit 120 to arrange operations of data in the order of receiving data from the server 200.

The present invention prevents the display of unnecessary data in a limited area of the screen, and data needed by a user is displayed. Therefore, a user can easily manipulate a user terminal, and over-charging for the unnecessary data is prevented.

Although certain embodiments of the present invention have been shown and described above, it will be appreciated by those skilled in the art that changes may be made in these embodiments without departing from the principles and spirit of the invention, the scope of which is defined in the appended claims and their equivalents.

What is claimed is:

1. A display method, comprising:
   receiving first data from a first content provider through an external server;
   displaying the received first data on a screen;
   in response to a command for requesting second data being input while the first data is being received, transmitting a request to the first content provider to discontinue receiving the first data;
   receiving the second data from a second content provider, different than the first content provider, through the external server in response to the command for requesting the second data;
   displaying the second data on the screen; and transmitting a request to the first content provider to receive the first data continuously from a part which has been discontinued, and displaying the received first data on the screen.

2. The display method as claimed in claim 1, further comprising:
storing the data received from the external server in the internal memory.

3. The display method as claimed in claim 1, further comprising:
if a command for requesting third data is input before all of the second data are received, discontinuing to receive un-received data among the second data, receiving the third data from a third content provider through the external server, and displaying the received third data, and
continuing to receive the discontinued data among the first and second data from the first content provider or the second content provider through the external server if the displaying of the third data is completed.

4. The display method as claimed in claim 3, further comprising continuing to receive the discontinued data among the first data and then continuing to receive the discontinued data among the second data.

5. The display method as claimed in claim 1, further comprising substituting temporary data for the discontinued data among the first data, and displaying the temporary data.

6. The display method as claimed in claim 1, wherein the first data comprises data, which is displayed on the screen when a command for displaying a list of data is input, and the second data comprises data that is displayed on the screen when a command for scrolling the list of data is input.

7. The display method as claimed in claim 6, wherein the scroll command comprises a manipulation of a user scrubbing the screen, the screen is scrolled according to the degree of scrubbing, and the second data comprises data corresponding to a scrolled portion.

8. The display method as claimed in claim 1, wherein the first and second data are received in a limited number, comprising as many data that is displayed on the screen.

9. The display method as claimed in claim 1, wherein the first and second data comprise data containing an image that is produced by another user using the external server.

10. The display method as claimed in claim 9, further comprising receiving images contained in the first data and images contained in the second data from the external server, processing the received image according to a predetermined standard, storing the processed image in an internal memory, and displaying the image on the screen.

11. The display method as claimed in claim 1, further comprising:
if the displaying of the second data is completed, continuing to receive the discontinued first data from the first content provider through the external server.

12. A user terminal which receives and displays data stored in a server, the user terminal comprising:
a network interface unit which requests the server to transmit data, and receives the requested data; and
a controlling unit, which receives first data from a first content provider through the server and displays the data in the order of the data being received, discontinues to receive un-received data among the first data in response to a command for displaying second data being input while the first data is being received, transmits a request to the first content provider to discontinue receiving the first data, receives the second data from a second content provider, different than the first content provider, through the server, displays the second data on a screen, transmits a request to the first content provider to receive the first data continuously from a part which has been discontinued, and displays the received first data on the screen.

13. The user terminal as claimed in claim 12, wherein the controlling unit receives data that is not stored in the memory from the server, among the first and second data, and displays the received data.

14. The user terminal as claimed in claim 13, wherein the first and second data comprise data containing an image that is produced by another user using the external server.

15. The user terminal as claimed in claim 14, wherein the controlling unit causes images contained in the first data and images contained in the second data to be received from the external server, the received images to be processed according to a predetermined standard, the processed images to be stored in the internal memory, and the images to be displayed on the screen.

16. The user terminal as claimed in claim 12, wherein if a command for displaying third data is input before all of the second data are received, the controlling unit discontinues to receive un-received data among the second data, receives the third data from a third content provider through the server and displays the received third data on the screen; and if the displaying of the third data is completed the controlling unit continues to receive the discontinued data among the first and second data from the first content provider or the second content provider through the server.

17. The user terminal as claimed in claim 16, wherein the controlling unit substitutes temporary data for the discontinued data among the first data, and displays the temporary data.

18. The user terminal as claimed in claim 12, wherein the controlling unit continues to receive the discontinued data among the first data and then continues to receive the discontinued data among the second data.

19. The user terminal as claimed in claim 12, wherein the first data comprises data that is displayed on the screen when a command for displaying a list of data is input, and the second data comprises data that is displayed on the screen when a command for scrolling the list of data is input.

20. The user terminal as claimed in claim 19, wherein the scroll command comprises a manipulation of a user scrubbing the screen, the screen is scrolled according to the degree of scrubbing, and the second data comprises data corresponding to a scrolled portion.

21. The user terminal as claimed in claim 12, wherein the controlling unit controls the first and second data to be received in a limited number, comprising as many data that is displayed on the screen.

22. The user terminal as claimed in claim 12,
wherein the controlling unit continues to receive the discontinued data from the server if the displaying of the second data is completed.

23. A data transmission system which transmits data stored in a server to a user terminal, the data transmission system comprising:
the server which stores a plurality of data, and transmits requested data to the user terminal; and
the user terminal which receives first data from a first content provider through the server and displays the data in the order of the data being received, discontinues to receive un-received data among the first data in response to a command for displaying second data being input while the first data is being received, transmits a request to the first content provider to discontinue receiving the first data, receives the second data through the server, from a second content provider that is different than the first content provider, displays the second data on a screen, transmits a request to the first content provider to receive the first data continuously from a part which has been discontinued, and displays the received first data on the screen.

* * * * *